United States Patent
Klappert et al.

(10) Patent No.: US 8,554,049 B2
(45) Date of Patent: Oct. 8, 2013

(54) SYSTEMS AND METHODS FOR SYNCHRONIZING PLAYBACK AT MULTIPLE LOCATIONS

(75) Inventors: Walter R. Klappert, Los Angeles, CA (US); Thomas S. Woods, Arlington Heights, IL (US); Michael R. Nichols, La Canada-Flintridge, CA (US)

(73) Assignee: United Video Properties, Inc., Santa Clara, CA (US)

( * ) Notice: Subject to any disclaimer, the term of this patent is extended or adjusted under 35 U.S.C. 154(b) by 99 days.

(21) Appl. No.: 13/338,526

(22) Filed: Dec. 28, 2011

(65) Prior Publication Data
US 2013/0170818 A1 Jul. 4, 2013

(51) Int. Cl.
*H04N 5/76* (2006.01)
*H04N 5/761* (2006.01)

(52) U.S. Cl.
USPC .......................................... 386/235; 386/299

(58) Field of Classification Search
USPC ................ 386/299, 291, 298, 286, 323, 341, 386/248, 262, 235
See application file for complete search history.

(56) References Cited

U.S. PATENT DOCUMENTS 6,708,176 B2 * 3/2004 Strunk et al. ........................ 1/1
7,373,650 B1 * 5/2008 Rodriguez et al. .............. 725/41

* cited by examiner

*Primary Examiner* — Robert Chevalier
(74) *Attorney, Agent, or Firm* — Ropes & Gray LLP

(57) ABSTRACT

Embodiments provide methods and systems for synchronizing simultaneous media asset viewing for users at different geographical viewing locations. In some embodiments, a first user device receives a request to synchronize viewing of a media asset with a second user device. Control circuitry may automatically determine that the media asset is available to the second user device after becoming available so the first user device. Based on the determining, the control circuitry may automatically schedule the media asset for recording on the first user device. In some embodiments, control circuitry synchronizes viewing of the media asset when the media access becomes available to the second user device. The second user device may access a video feed transmitted by a media source, while the first user device accesses a video feed of a recorded media asset.

22 Claims, 13 Drawing Sheets

700

Select Buddies for Synchronized Viewing

702

| Buddies | 704 | 706 | | Groups | 710 | 712 |
|---|---|---|---|---|---|---|
| Alvin | | ✓ 708 | | Fantasy Football League | | ☐ |
| Bill | | ☐ | | American Idol | | ✓ |
| Carter | | ☐ | | Ski Club | | ☐ 714 |
| David | | ☐ | | | | |
| Elizabeth | | ☐ | | | | |
| Florence | | ☐ | | | | |

Buddy Setup... 716

718 — Confirm Selected Buddies    720 — Configure Buddies

Program Synchronization Options

802 — You Selected: The Simpsons  2 FOX
7-8:00 pm  TV-14
"Kamp Krusty", Repeat

| Frequency | 804 | 806 | | Reminder | 808 | 810 |
|---|---|---|---|---|---|---|
| One Time | | ☐ | | 5 minutes before | | ☐ |
| Every Episode | | ☐ | | 10 minutes before | | ☐ |
| New Episodes Only | | ✓ | | 15 minutes before | | ✓ |
| | | | | 30 minutes before | | ☐ |
| | | | | 1 hour before | | ☐ |
| | | | | No reminder | | ☐ |

Switch Program — 812

Confirm Program — 814

| Synchronization Summary | |
|---|---|
| 902 You Selected: | The Simpsons    2 FOX<br>7-8:00 pm    TV-14<br>"Kamp Krusty", Repeat |

904

View Times:
You: 9:00 pm EST
Alvin: 8:00 pm CST
Edgar: 7:00 pm MST

Channels:
You: FOX 2
Alvin: FOX 4 HD
Edgar: FOX 43

Reminder Settings:
You: 15 minutes before
Alvin: No reminder
Edgar: No reminder Frequency:
All new episodes

906 — Change Program
908 — Add/Subtract Buddies
910 — Add Buddy Reminders
912 — Adjust Reminder
914 — Change Frequency
916 — Done

Synchronization Invitation

1002

Program Selected:    The Simpsons    43 FOX
                             7-8:00 pm    TV-14
                             "Kamp Krusty", Repeat Other Viewers:       Edgar (8:00 CST)
                             Oscar (9:00 EST)

1004 — Accept Invitation
1006 — Accept and Set a Reminder
1008 — Decline
1010 — Adjust Synchronization

Synchronized Program

1304

1400

1402

Synchronized Program

| Barbara: | When will they show us Kim's dress? |
| Winnie: | I thought the bridesmaids were supposed to be wearing green! |
| Geraldine: | Yeah! Ivory looks so much better though |

Add a comment: _____

1404

SYSTEMS AND METHODS FOR SYNCHRONIZING PLAYBACK AT MULTIPLE LOCATIONS

BACKGROUND

With conventional media guidance applications, if viewers in different locations want to watch a program at the same time, certain complications and uncertainties can arise. For example, if one viewer is in a location that airs a program before it is aired in a second viewer's location, the second viewer may not know whether the first viewer has already viewed the program. If the program is a drama or sports event, the first viewer may spoil a plotline or result or a program for the second viewer. If the program is a game show, the first viewer may have learned answers to trivia questions or puzzles in an earlier viewing. In these situations, the second viewer may become annoyed or feel cheated by the first viewer. Additionally, if viewers are in different regions or have different media providers, the airings of the program may not be lined up when taking into account, for example, the lengths of commercial breaks. This would cause difficulty in coordinating synchronized viewing. In addition, previously considered methods for synchronizing recorded media do not consider synchronizing a recorded program with a program presently airing in a different location.

SUMMARY OF THE INVENTION

Accordingly, methods and systems are described herein for synchronizing simultaneous media asset viewing for users at different geographical viewing locations. In one embodiment, a user device receives from a user a request to synchronize the viewing of a particular program with a second user device. The user device may send an invitation to participate in synchronized viewing to the second user device, which a user of the second user device may either accept or decline. If the user accepts the invitation, a notification may be sent to the first user device. If the program becomes available to second user device after becoming available to the first user device, e.g., because the first user device is in an earlier time zone than the second user device, the first device may record the program so that it is available to the first user device when the program becomes available to the second use device. To determine if any user devices should record the program, a processor may retrieve, from storage and/or an external data source, information indicating the time at which the program will be available (i.e., the availability times) for the first and second user devices. The processor then may compare the availability times of the user devices to determine the user device at which the program becomes available the latest (in this case, the second user device). Based on the result of the comparison, the processor may generate instructions for the first user device to automatically schedule recording of the program. Once the program has become available to the first and second user devices, the program may be synchronized as the program is being transmitted to the second user device. During synchronization, the first user device may access the program from a video feed retrieved from storage, and the second user device may access the program from a video feed transmitted from a media source.

In some embodiments, if the program becomes available to the first user before the scheduled time for synchronized viewing, the first user may have the opportunity to watch the program before the scheduled time. This may negatively impact the joint synchronized viewing experience of the user of the second user device, since the user of the first user device will know, for example, plot twists, game scores, or trivia answers before the user of the second user device. To prevent this undesirable situation, the second user device may automatically be alerted if the first user device displays the program before the scheduled time for synchronized viewing. In some embodiments, the user of the first user device is then prevented from participating in the synchronized viewing. To avoid watching a program ahead of the scheduled time and experiencing such consequences, the first user device may present a warning to the user if the user attempts to watch a program before its scheduled time.

Because the program is accessed by the user devices from different sources, different versions of the program may not line up exactly in time. For example, the lengths of the advertisements or the speed at which a program is displayed to different users may differ between different versions of the same program. Thus, in some embodiments, a processor receives data related to frames or segments displayed at particular times at the user devices. From this data, the processor can generate commands to speed up, slow down, or temporarily pause the display of the program at a particular user device. In some embodiments, a user device displaying a video as it is being received may include a buffer. The buffer can enable small adjustments in display of the program to maintain synchronization with other user devices.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 is an illustrative display screen showing a selectable list of buddies and groups for synchronized viewing in accordance with an embodiment of the invention;

FIG. 8 is an illustrative display screen showing selectable synchronization setup options in accordance with an embodiment of the invention;

FIG. 9 is an illustrative display screen showing a synchronization summary for a program scheduled for synchronized viewing in accordance with an embodiment of the invention;

FIG. 10 is an illustrative display screen showing a synchronization invitation in accordance with an embodiment of the invention;

DETAILED DESCRIPTION OF EMBODIMENTS

Figure 1:
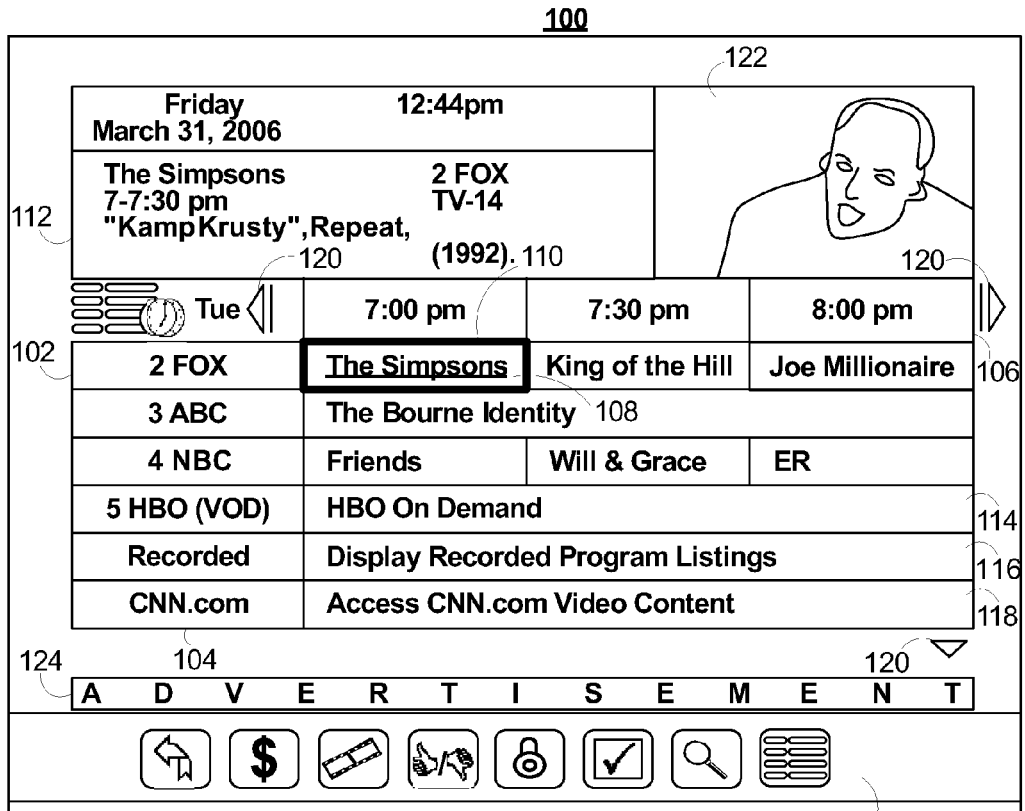
FIG. 1 shows and illustrative display screen that may be used to provide media guidance application listings and other media guidance information in accordance with an embodiment of the invention.

The amount of media available to users in any given media delivery system can be substantial. Consequently, many users desire a form of media guidance through an interface chat allows users to efficiently navigate media selections and easily identify media that they may desire. An application that provides such guidance is referred to herein as an interactive media guidance application or, some a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
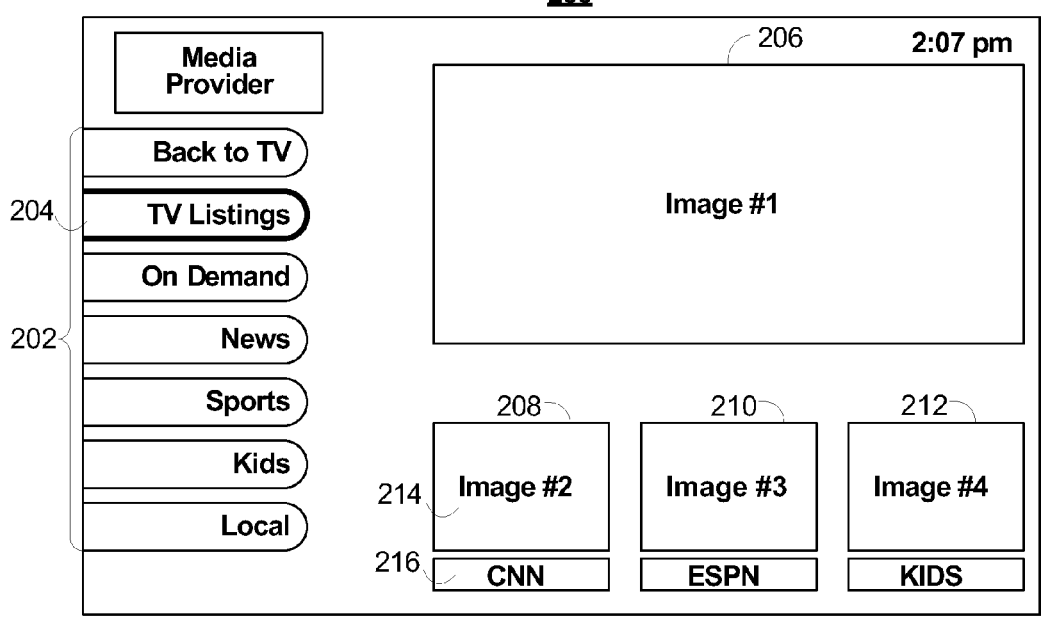
FIG. 2 shows another illustrative display screen that may be used to provide media guidance application listings in accordance with an embodiment of the invention.

One of the functions of the media guidance application is to provide media listings and media information to users. FIGS. 1-2 show illustrative display screens that may be used to provide media guidance, and in particular media listings. The display screens shown in FIGS. 1-2 and 5-15 may be implemented on any suitable device or platform. While the displays of FIGS. 1-2 and 5-15 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to nonlinear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. at al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 113 are shown as spanning the entire time block displayed in grid 102 to indicate thou selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued. May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al, U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,383,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of de present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe no a premium service, edit a user's profile, access a browse overlay, or other options. Another selectable option in the options region 126 may relate to setting up synchronized viewing with a viewer at a different location.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity no determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from a handheld device of the user, etc.), and/or obtain information about the user from other sources that the media guidance application may access. As a result, a user can be provided, with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Foyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 203 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
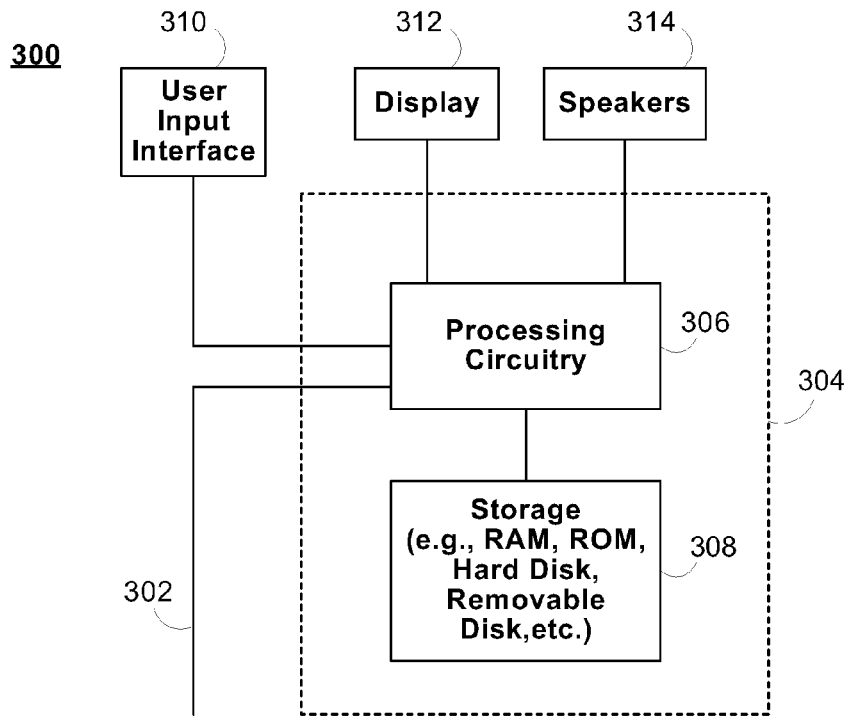
FIG. 3 is a block diagram of an illustrative user equipment device in accordance with an embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In some embodiments, control circuitry 304 may receive user input for scheduling synchronized viewing of a program with other user equipment. Control circuitry 304 may automatically generate an invitation to send to other user equipment. In particular, the invitation may instruct control circuitry 304 on the other user equipment to display the invitation to a user with display 312 and receive a response to the invitation at the other user equipment, which is sent back to the sending user equipment. Control circuitry 304 may determine whether it or other user equipment should record the program when it becomes available. In some cases, control circuitry 304 may instruct tuning and encoding circuitry to record a program for synchronized viewing. Control circuitry 304 may coordinate synchronized of a program viewing with other user equipment. These and other aspects of control circuitry 304 are described in further detail below.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below). In particular, the communications circuitry may be suitable for communicating over a network with other user equipment devices, either directly or through a central server, to schedule simultaneous viewing of programs and synchronize the display of programs for simultaneous viewing.

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touch pad, stylus input, joystick, voice recognition interface, or other user input, interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In other embodiments, the guidance application may be defined by a series of JAVA-based files that are received and run by a local virtual machine or other suitable middle-ware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
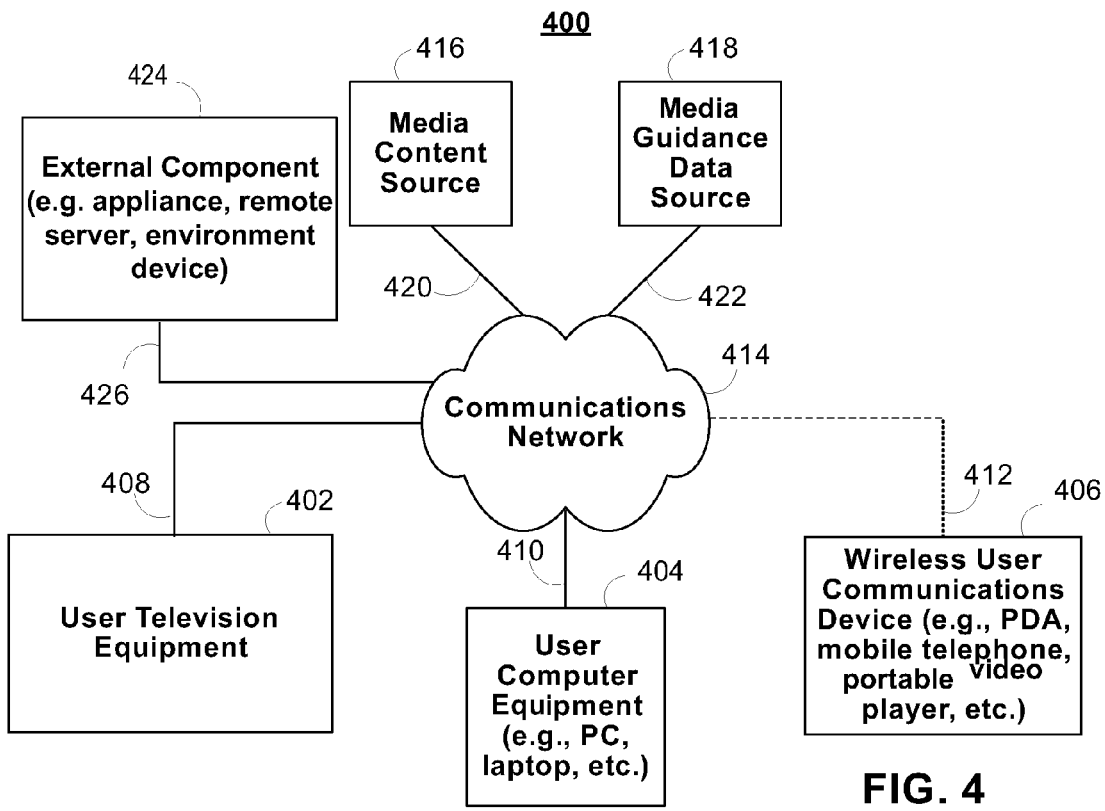
FIG. 4 is a block diagram of an illustrative interactive media system in accordance with an embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USE cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) if desired, media content source 416 and media guidance data source 413 may be integrated as one source device. Although communications between sources 416 and 418 with user equipment devices 402, 404, and 406 are shown as through communications network 414, in some embodiments, sources 416 and 413 may communicate directly with use equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis at al., U.S. patent application Ser. No. 09/332,244, filed Jun. 11, 2099, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, user-specified period of time, a system-specified period of time, in response to a request from user equipment, etc.). In some approaches, guidance data from media guidance data source 418 may be provided to users equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

As discussed herein, an application running on user equipment may be used for scheduling synchronized viewing, communicating information related to the synchronized viewing to another interactive media guidance application on a user equipment device in another geographic location, and simultaneously synchronizing display of the program with the interactive media guidance application in the other geographic location. These functions are described herein as being performed by or in relation to an interactive media guidance application; however, in other embodiments, any other application running on user equipment can be used to carry out the methods described herein. As used herein, a program refers to a media asset which can be accessed via a video feed, an audio feed, a video file, or an audio file. As used herein, synchronized viewing refers to a process wherein a program is displayed or otherwise presented to a first viewer on a first user equipment device while the same program or a similar program (e.g., the same base program broadcast on a different network with different advertisements) is being displayed or presented no a second viewer by a second user equipment device, such that during a given segment of time, the portion of the program being presented by the first user equipment device is substantially the same as the portion of the program being presented by the second user equipment device. In other words, the first and second user equipment devices simultaneously present the same program. As used herein, "Buddies" refer to other users that may participate in synchronized viewing, and "Groups" refer to collections of two or more other users that may participate in synchronized viewing.

In some embodiments, the program becomes available at some user equipment devices before it becomes available at other user equipment devices. A program becomes available when a user equipment device is able to access the program. For example, a program may become available when it is broadcast, webcast, or made available on-demand to a television, computer, smart phone, or other media access device. A program may be made available when the media access provider receives a payment for a particular program (e.g., a pay-per-view program). A program may be made available when a user receives physical media, such as a CD-ROM, DVD, Blu-ray disc, or USB drive, containing the program.

In general, control circuitry 304 at a first user equipment device receives via user input interface 310 input from a user to schedule synchronized viewing with one or more users of additional user equipment devices. The input may include, for example, the program for simultaneous viewing, the time at which the program becomes available at the first user equipment device and/or additional user equipment device, and an identification of at least one other user to engage in synchronized viewing. Control circuitry 304 communicates via communications network 414 information related to the scheduled synchronized viewing to the user equipment of the at least one other user. Control circuitry 304 determines whether it should cause the first user equipment device to record the program (e.g., if the program airs at the first user equipment device before it airs on another user equipment device) and records the program if needed. Once the program becomes available to all of the user equipment devices, control circuitry 304 of one or more of the user devices and/or a central server coordinate synchronized viewing of the program.

Figure 5:
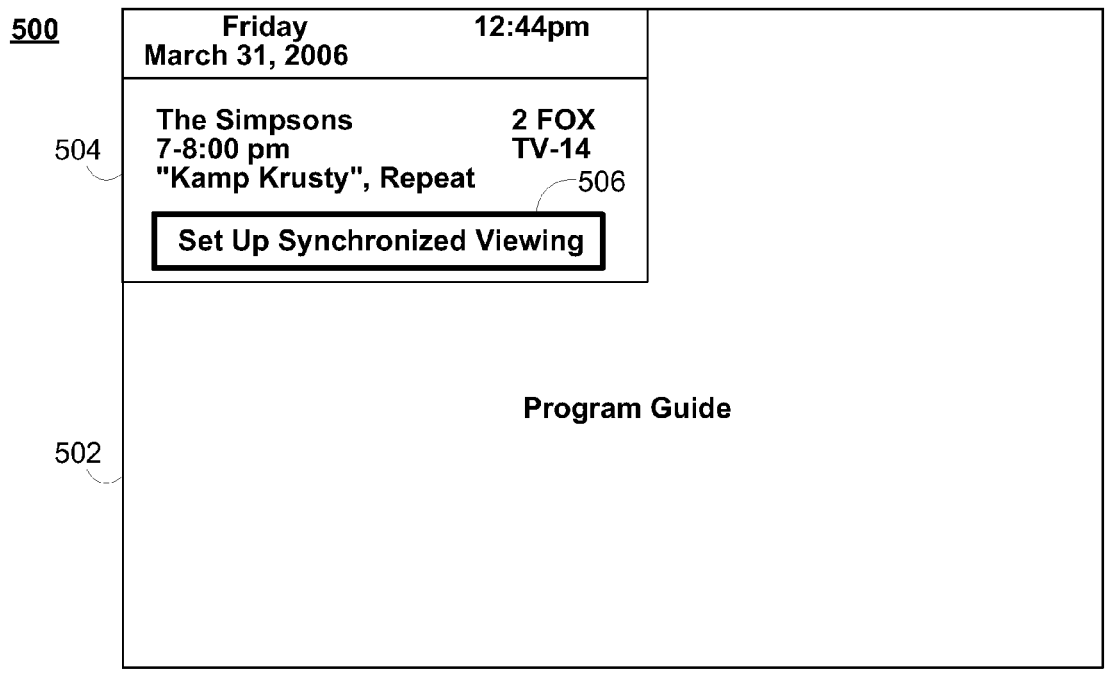
FIG. 5 is an illustrative display screen for displaying an option to set up synchronized viewing for a program in accordance with an embodiment of the invention.
Figure 6:
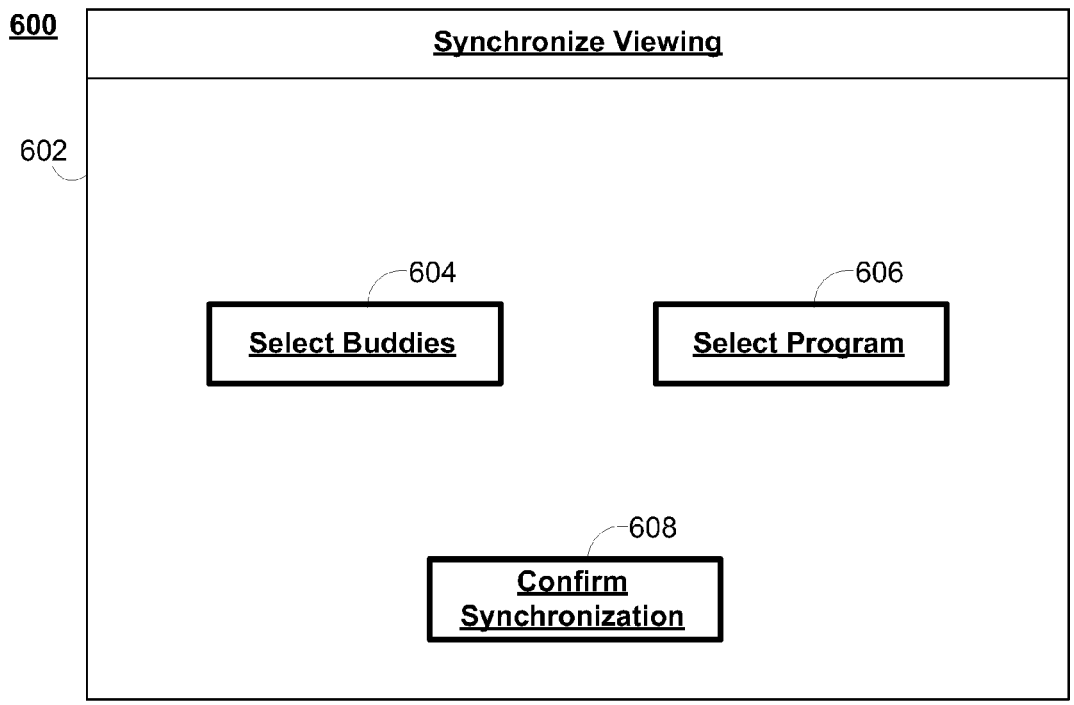
FIG. 6 is an illustrative display screen for displaying selectable synchronization set up elements in accordance with an embodiment of the invention.

The process of setting up and carrying out synchronized viewing between multiple viewers is illustrated by the display screens shown in FIGS. 5 through 15. The process of setting up synchronized viewing is initiated when control circuitry 304 receives an indication that a user wishes to schedule synchronized viewing. This is illustrated in FIG. 5, which is an illustrative display screen 500 of an interactive media guidance application that shows an option to sec up synchronized viewing for a program. As shown in FIG. 1, a user can select a program listing by, for example, moving a highlight region or a cursor in a program guide 502. Information relating to the program listing selected in the program guide 502 may be provided in program information region 504. The program information region 504 may include, for example, the program title, the program description, the time the program becomes available, the channel the program is on, the program's rating, and any other information that may be of interest to the user. The program information region 504 includes a Set Up Synchronized Viewing button 506. Selecting the Set Up Synchronized Viewing button 506 causes control circuitry 304 to instruct the display to present synchronized viewing setup user interfaces, such as those illustrated by the display screens of FIGS. 6-9. In particular, after control circuitry 304 has received a command from a user to set up synchronized viewing for the program shown in the program information region, control circuitry 304 may instruct the display to present an interface that allows a user to select one or more other viewers to invite for synchronized viewing.

In other embodiments, control circuitry 304 may provide access to synchronized viewing setup via the interactive media guidance application without requiring the user to select a program in a program guide. For example, as described in relation to FIG. 1, one of the selectable options in the options region 126 of the interactive media guide application may be an option so set up synchronized viewing. In other embodiments, a user input device may have a particular button or sequence of buttons which, when selected, cause control circuitry 304 to present a synchronized viewing setup user interface, such as the Synchronize Viewing screen shown in FIG. 600.

The Synchronize Viewing screen 600 presents selectable synchronization setup elements. As shown, the synchronize menu 602 includes three buttons: a Select Buddies button 604, a Select Program button 606, and a Confirm Synchronization button 608. If the user selects the Select Buddies button 604, control circuitry 304 causes the display to present a user interface on a new screen or an overlay by which control circuitry 304 can receive input from the user indicating buddies or groups of buddies to invite to participate in synchronized viewing. If the user selects the Select Program button 604, control circuitry 304 causes the display to present a user interface on a new screen or an overlay, such as the program grid 102 shown in FIG. 1, by which control circuitry 304 can receive input the user indicating a selected program for synchronized viewing. The synchronization menu 602 may include additional buttons to display additional menus as needed. Once the user has chosen buddies and a program, the user may select the Confirm Synchronization button 608, which causes control circuitry 304 to add the program to its schedule, send the synchronization information to the selected buddies, and in some cases, record the program. In some embodiments, the user may review and confirm the settings through, for example, the Synchronization Summary screen shown in FIG. 9

If the user selected a program before selecting to set up synchronization, e.g., as shown in FIG. 5, control circuitry 304 may not display the synchronization menu 602, but rather immediately presents a user interface with which the user can select buddies.

A Select Buddies screen 700 for presenting selectable buddies and groups of buddies to invite to participate in synchronized viewing is shown in FIG. 7 A buddy selection menu 702 displays a list of buddies 704 and a list of groups 710. In general, buddies are other users that a user knows personally, such as family member, friends, club or team members, or coworkers. Groups are collections of two or more users. In some embodiments, a group is a list of buddies with which a user wants to watch multiple programs. For example, a fantasy football league may create a fantasy football group to set up synchronized viewing of NFL games. In such a case, it may be easier for the user to select a group of his buddies than select each individual buddy each time the user wants to set up a synchronized viewing. In some embodiments, a user can group his buddies without the buddies receiving notification that they are in a group. In other embodiments, information about a group created by one user is proliferated to the other members of the group, so that each member knows they belong to the group and may be able to invite the group for synchronized viewing. In some embodiments, group members may not be personally known to a user, but may share a common interest and subscribe to a group based on the common interest. For example, a fan of the program "American idol" may join an American idol group to participate in synchronized viewing with other fans that the fan may or may not know. In some embodiments, a group may have one or more group masters who can create synchronization invitations as well as group members who can receive and respond to, but not create, synchronization invitations.

Via the buddy selection menu 702, control circuitry 304 receives input from a user indicating one or more available buddies and/or groups to invite for synchronized viewing. For example, the buddy selection menu 702 may include check boxes 706 and 712 next so each buddy and group. Control circuitry 304 may then cause the display to visually indicate that the buddy or group has been selected by, e.g., putting a check 703 or other marking in the box 706 or 712, by highlighting the buddy, by changing the color of the buddy's name or group name, or another visual representation.

Figure 11:
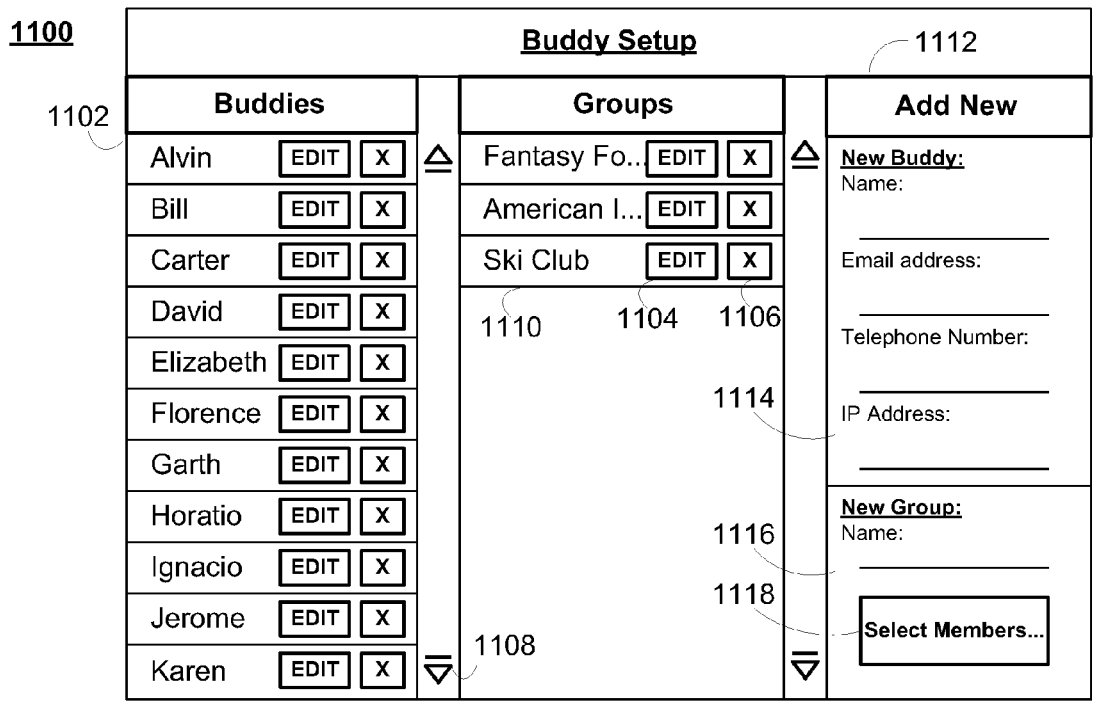
FIG. 11 is an illustrative display screen showing buddy setup features for modifying buddy lists for use in synchronized viewing in accordance with an embodiment of the invention.

The buddy selection menu 702 also includes a Buddy Setup button 716. When the Buddy Setup button 716 is selected, control circuitry 304 instructs the display to present a user interface on a new screen or an overlay. From this Buddy Setup interface, control circuitry 304 can receive instructions to change the buddy list by, for example, adding or removing buddies, changing information related to existing buddies, or adding, removing, or editing groups. An exemplary implementation of a buddy selection menu is shown in FIG. 11. The buddy selection menu 702 also includes a Confirm. Selected Buddies button 713. When the Confirm Selected Buddies button 718 is selected, control circuitry 304 stores the selected buddies and causes the display to present a different user interface screen, such as main Synchronize Viewing screen 600, or an interface screen for performing an additional step in synchronization setup, such as a Select Program screen which displays a selectable program guide, or Program Synchronization Options screen, shown in FIG. 8. The buddy selection menu 702 may also include a Configure Buddies button 720, which, when selected, causes control circuitry 304 to instruct the display to present configurable options for the display of the buddies and groups, e.g., the order in which the buddies and groups should be displayed in the interactive media guidance application, whether any buddies or groups should be automatically included for all or particular programs, and how many buddies and/or groups to display on the screen.

In addition to selecting the program and other viewers for synchronized viewing, other options, such as reminders and frequency settings, may be received by control circuitry 304. A Program Synchronization Options screen 800 for presenting such selectable program synchronization setup options is shown in FIG. 8. At the top of the screen, control circuitry 304 instructs the display to present a summary of information 802 of the program selected for synchronized viewing. Below the summary section 802 is a selectable frequency setting which lists several frequencies 804 with which the program can be scheduled for synchronized viewing and a check box selection interface 806 for receiving user input of a frequency. Through the frequency selection interface 806, control circuitry 304 receives input indicating that the program should be scheduled for synchronized viewing a single time only, each time an episode is aired, or only when new episodes are aired. The Program Synchronization Options screen 800 also includes a selectable reminder setting 808 with which control circuitry 304 can receive an instruction to present a reminder to the user that the user is scheduled to engage in synchronized viewing through a check box selection interface 810. The reminder times listed are lengths of time before the synchronized viewing is scheduled to begin. For example, control circuitry 304 can present a reminder 5 minutes, 10 minutes, 15 minutes, 30 minutes, or an hour before synchronized viewing is scheduled. In some embodiments, control circuitry 304 may be configured to instruct a device other than the user equipment with which the synchronized program is presented to display a reminder or otherwise alert the user of the scheduled time for synchronized viewing. For example, if the user watches the program on a television, the reminder may be presented on the user's cell phone.

Once information related to some or all of the program, buddies and/or groups, reminder, and frequency of the program selected for synchronized viewing has been received, control circuitry 304 may seek a user confirmation of the synchronization selections. To allow the user to review the scheduled synchronized viewing and confirm the settings, control circuitry 304 may instruct the display to present a Synchronization. Summary screen 900, shown in FIG. 9. The synchronization summary screen 900 may be displayed after control circuitry 304 has a command from the user that the user is finished inputting schedule information and wishes to confirm the synchronization setup by, for example, a user selection of the Confirm Synchronization button 608 of FIG. 6. The Synchronization Summary screen 900 may be displayed any time between the confirmation of the synchronization getup and before the program is simultaneously viewed in synchronized viewing. For example, if control circuitry 304 receives input that a program scheduled for synchronized viewing was selected in a program guide (e.g., grid program listings display 100 of FIG. 1), control circuitry 304 may instruct the display to present a synchronization summary 900 for the program. At the top of the synchronization summary screen 900, a summary of information 902 of the program selected for synchronized viewing is displayed. Below the program summary section 902, additional information related to the synchronized viewing, such as the scheduled viewing times for invited participants in their respective time zones, the channels on which the program is aired for the respective invited participants, the reminder settings for each of the invited participants in synchronized viewing, and the frequency setting, are displayed. In other embodiments, less information, additional information, or alternative information is displayed in the summary. The contents of the summary section may change over time. For example, if an invited participant declines to participate in synchronized viewing, this may be noted in the summary section, and the information for the participant in the various aforementioned categories may be removed. Similarly, if the user who created the synchronization invitation or another user invites additional participants, information related to the one or more additional participants may be added to the summary.

The synchronization summary screen 900 also includes various buttons 906-914 for receiving input that the user wants to adjust the synchronization settings. If the control circuitry 304 receives a selection of one of these buttons, control circuitry 304 causes the display to present, on a new screen or an overlay, an appropriate user interface for receiving changes to the program, receiving instructions to add or remove buddies, receiving reminder settings for buddies, receiving changes to a reminder setting, or receiving a command to change the frequency of synchronized viewing. Below these buttons is a one button 916 which, when selected, causes the interactive media guidance application to return to a different screen, such as the grid program listings display 100 shown in FIG. 1.

Once control circuitry 304 receives confirmation of the settings, it transmits one or more synchronization invitations to the selected buddy or buddies and/or group(s). The synchronization invitations may be transmitted over communications network 414. The communications circuitry of the user device may communicate directly with other users' user device(s), which may be one of user television equipment 402, user computer equipment 404, or wireless user communications device 406, to transmit invitations, or the invitations may be transferred through a central server or other centralized system. The user device may receive responses from the invitees via the same communication pathway through which the invitation was sent, such as communications network 414, or via a different communication pathway.

The synchronization invitation includes data related to the program selected, such as the program title, the program time, and the station on which the program airs. In some embodiments, the synchronization indication includes a program identifier with which control circuitry on the receiving user equipment can look up the program information from, for example, guidance data in storage 308 or media guidance data source 418. The synchronization also includes data related to the sender of the invitation, such as name, IP address, email address, telephone number, location, or user profile information. The synchronization may include similar data related so the other invitees.

Control circuitry on the receiving user equipment processes the received synchronization invitation to generate Synchronization Invitation screen 1000, shown in FIG. 10. A synchronization invitation may be viewed on, for example, user television equipment 402, user computer equipment 404, or wireless use communications device 406. The synchronization invitation may be presented on the same user device that will display the synchronized program or a different device. For example, a user who watches synchronized programs on user television equipment 402 may receive synchronization invitations his wireless user communications device 406, since he may be able to respond to invitations more quickly or with greater ease using his wireless user communications device 406 than using his user television equipment 402. In some embodiments, the synchronization invitation is sent to multiple devices associated with a single user. The user may be able to respond to the invitation on any device. In addition to receiving a response to the invitation to send to the inviter, control circuitry 304 of the device may receive an indication of the device on which he will watch the program.

The Synchronization Invitation 1000 includes a synchronization summary 1002, which includes information about the program selected, e.g., the program title, the channel on which the program airs locally, and the time at which the program is scheduled for synchronized viewing. The summary portion of the invitation also displays the other participants. In some embodiments, the invitation includes more detailed status information of the participants, such as indications of the user from which the invitation originated, which users have accepted the invitation, which users have declined the invitation, and which users have not yet responded no the invitation.

Control circuitry 304 of the user device receiving the invitation (i.e., the invitee) causes its associated display to present, below the synchronization summary 1002, options for responding to the invitation, such as a button to accept the invitation 1004, a button to accept the invitation and set a reminder 1006, a button to decline the invitation 1008, and a button to adjust the synchronization settings 1010. When control circuitry 304 of the invitee receives a decision to accept, accept and set a reminder, or decline, control circuitry 304 sends the decision to the other participants. When control circuitry 304 of the invitee receives a decision to accept and set a reminder or adjust the synchronization, it causes a display to present a user interface screen or overlay to the user with which the user can input reminder settings or synchronization setting adjustments. Control circuitry 304 of the invitee sends the synchronization setting adjustments to the other users invited for synchronized viewing. The other users may accept the revised synchronization settings, reject the revised synchronization settings, further adjust the synchronization settings, or decline to participate in the revised synchronization.

In some embodiments, control circuitry may be programmed to generate and send automatic responses to invitations. For example, as instructed by the user, control circuitry 304 may automatically accept invitations from particular users or for particular programs, or automatically decline invitations from particular users or particular programs. In some embodiments, after a user has agreed to participate synchronized viewing of a program, control circuitry 304 may be programmed to decline additional invitations for the same program. Control circuitry 304 may be programmed to decline invitations having synchronized viewing scheduled during a particular time interval, e.g., during the user's work hours, or while the user is on vacation.

In addition to sending and receiving the invitations, control circuitry 304 at the inviting user device and/or the invited user device determines whether it should record the program. In some embodiments, a particular user device should record the program if the time at which the selected program becomes available at that user device is earlier than the time at which the program becomes available at another of the participating user devices. For example, if a user device located in California invites a buddy in New York to simultaneously view a program, the program may become available (e.g., is broadcast) in California after it becomes available (e.g., is broadcast) in New York. In this case, the California viewer is in the latest broadcasting location, and the user device in New York records the program when it is broadcast at an earlier time, e.g., three hours earlier (step 1620).

In order to determine if it should record the program, control circuitry 304 retrieves from storage 303 and/or media guidance data source 413 schedule information indicating when the program will be available to the user device. Control circuitry 304 also receives schedule information of one or more other user devices participating in or invited to participate in synchronized viewing. For example, control circuitry 304 may determine the location of a participating device and, based on the location, retrieve schedule information over the communications network from the media guidance data source 418 or from another provider of schedule information. In some embodiments, control circuitry 304 sends to other invited user devices a request that the other user devices return schedule information. The control circuitry may also send information identifying the program, and may request only the time at which the program becomes available at the respective user devices, rather than all of the schedule information. Control circuitry 304 then may receive the schedule information for at least the program of interest directly from the other user devices.

Once control circuitry 304 has retrieved or received the schedule information that indicates what time the program becomes available (i.e., availability time) in ice own location and for the other invited user devices, control circuitry 304 compares its availability time to the availability times of the other user device. Control circuitry 304 may adjust some or all of the availability times to a common time zone, e.g., its own time zone or Coordinated Universal Time (UTC), to perform the comparison. If the result of the comparison indicates that the availability time of control circuitry 304 is before the availability time of at least one other user device, control circuitry 304 automatically schedules the recording of the program. Control circuitry 304 may also be configured to send the results of the comparison to the other user devices. Control circuitry 304 may alternatively or additionally send instructions to automatically schedule the recording of the program to other user devices if the comparison identifies other user devices with an availability time before the availability time of at least one user device. In some embodiments, the above described process of determining which user device(s) should record the program is performed by a central server, and the central server sends instructions to automatically record the program to the applicable user devices.

Once the program has become available to all of the user devices, the program is synchronized as the program is being transmitted to the user device with the latest availability time. During synchronization, the device or devices with the latest availability time display the program as it is transmitted, while the other device or devices display the program from storage 308. At the scheduled time for synchronized display of the program (i.e., the latest availability time), the user devices may automatically begin displaying the synchronized program, or one or more of the participants may need to input a command to tune to the program or otherwise begin participating in synchronized viewing.

The user device at which the program becomes available last may change in between the initial scheduling of the synchronization and the time that the synchronization occurs. For example, participants may be invited in three locations in which a program becomes available at 7:00 pm EST in a first location, at 8:00 pm EST in a second location, and 9:00 pm EST in a third location. The participants are scheduled to all view the program at 9:00 pm EST. Initially, the third location is where the program becomes available last. If all of the users in the third location decline to participate, the second location becomes the location in which the program becomes available last. In this case, the remaining participants can view the synchronized program at the originally scheduled time (9:00 pm EST), or they may witch the program at 8:00 pm EST. If they advance the viewing to 8:00 pm EST, the user devices in the second location may access the program as it is broadcast rather than accessing the recorded program from storage. In another example, if the participants in the third location accept the invitation and invite a participant in a fourth location in which the program becomes available at 10:00 pm EST, the scheduled viewing time for all of the original participants shifts 1 hour later, and the user devices in the third location are no longer in the latest location in which the program becomes available. Therefore, the user devices at the third location would record the program as it is made available.

The user of the interactive media guidance application may wish to add buddies or groups or otherwise modify the buddy and/or group lists. A Buddy Setup screen 1100 for modifying buddies and groups is shown in FIG. 11. The Buddy Setup screen 1100 includes a section displaying a list of buddies 1102, a section displaying a list of groups 1110, and a section for adding a new buddy or group 1112. The buddy list 1102 and group list 1110 can be navigated using, for example, scroll bars 1108 if a user has more buddies or groups than can be displayed on the screen. Information for each of the buddies and groups can be edited by selecting an edit button 1104. When control circuitry 304 receives a selection to edit a buddy, control circuitry 304 causes the display to present a user interface on a new screen or an overlay with which the user can input, for example, a change in the name or contact information of a buddy. When control circuitry 304 receives a selection to edit a group, control circuitry 304 instructs the display to present a user interface on a new screen or an overlay with which the user can input, for example, additions or deletions to group members, or changes in names of group members and/or contact information of group members. The Buddy Setup screen may also include a way for a user to delete buddies or groups. For example, the Buddy Setup screen 1100 includes an "X" 1106 next to each buddy and group; selecting the "X" 1106 causes control circuitry 304 to delete the buddy or group. Control circuitry 304 may instruct the display to present a confirmation screen or overlay before a buddy or group is deleted.

The section for adding a new buddy or group 1112 includes a New Buddy section 1114 and a New Group section 1116. In the New Buddy section 1114, the user can enter the name and contact information, such as email address or telephone number or the buddy, and/or IP address of the buddy's user equipment. The contact information allows control circuitry 304 to send synchronization invitations to the buddy via a communications channel, and it may enable the user device to communicate with the buddy's user device during synchronized viewing. In some embodiments, control circuitry 304 generates a notification to a new buddy that the user has added the new buddy and instructs the user device to send the notification to the new buddy. The new buddy may need to confirm an invitation that he wants to he added as the user's buddy. This may also cause the new buddy's control circuitry to add the inviting user as a buddy. In the New Group section 1116, the user can input a name for the new group and select a Select Members button 1118. When control circuitry 304 receives a selection of the Select Members button 1118, control circuitry 304 instructs the display to present a user interface on a new screen or an overlay with which the user can select buddies to add to the group.

Figure 12:
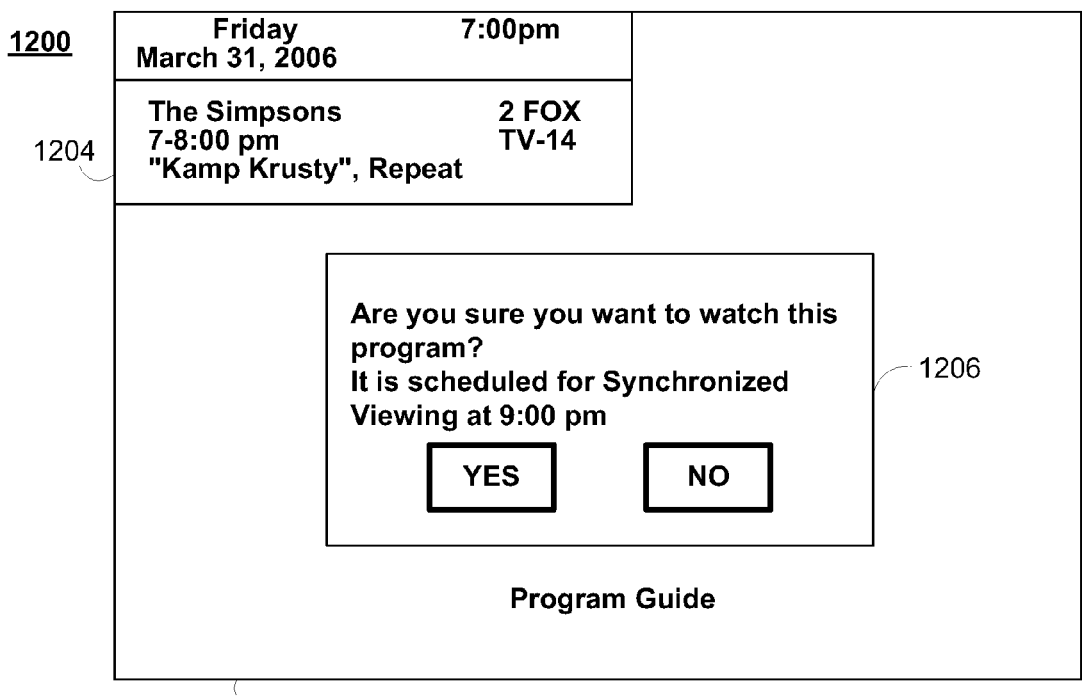
FIG. 12 is an illustrative display screen showing a warning overlay screen in accordance with an embodiment of the invention.

In some embodiments, the systems and methods described herein relate to control circuitry 304 that notifies users if another viewer with which they are scheduled for synchronized viewing has already viewed a program or a portion of a program. Control circuitry 304 may even prevent a viewer who has seen a program from engaging in synchronized viewing of that program at the scheduled time. This prevents viewers who have already watched, for example, a game show or a drama, from providing answers to puzzles or questions that the user learned in a previous viewing or spoiling the plotline of a drama for the other viewers. To avoid accidental viewing of a program scheduled for synchronized viewing, control circuitry 304 can provide a warning to the user if he attempts to view such a program. For example, a program guide screen 1200 including a warning overlay screen 1206 for warning a user that the user is attempting to view a program scheduled for later synchronized viewing is shown in FIG. 12.

To help safeguard a viewer from the consequences of viewing a program before it is scheduled for synchronized viewing, the interactive media guidance application displays an on-screen warning 1206 if the user attempts to watch the program by, for example, selecting the program in a program guide 1202, entering the channel on a user input device, e.g., a remote control, selecting the program from a list of available programs, or purchasing a pay-per-view program. The warning screen 1206 provides information about the scheduled viewing and accepts input indicating whether the interactive media guidance application should cause the program to be presented.

Despite such a warning, a user may still decide to watch a program before its scheduled time for synchronized viewing. So, control circuitry 304 monitors the programs being viewed on the device to determine whether the device is displaying or has already displayed the program scheduled for synchronized viewing before the scheduled time for synchronized viewing. If control circuitry 304 determines that the viewer has viewed, the program ahead of the scheduled time, control circuitry 304 automatically sends an alert to the other devices scheduled to participate in synchronized viewing. In some embodiments, this information is registered or stored at a central database for retrieval by the other user devices. User devices may able to determine whether another user device has viewed a program without the other user device transmitting an alert.

Figures 13, 14:
FIG. 13 is an illustrative display screen showing synchronized program display with a warning indicator in accordance with an embodiment of the invention.
FIG. 14 is an illustrative display screen showing synchronized program display with a chat feature in accordance with an embodiment of the invention.

When control circuitry determines or receives an indication that another user device has viewed the program, control circuitry 304 may present a warning indicator as shown in FIG. 13 as the synchronized program is being displayed. The warning indicator indicates to the viewer that a user participating in synchronized viewing has already watched all or part of the program and is still engaging in the synchronized viewing. Control circuitry 304 may receive a selection indicating that the user would like to view more information related to the warning. Such a selection may be received from a user input device with which the user can, for example, click or scroll over the warning indicator or press a particular button. Receiving a user selection that the user would like to see more information related to the warning causes control circuitry 304 to instruct the display to present, on an overlay screen or new screen, names of viewers who have watched the program, how much of the program they watched, and/or other pertinent information. If only a portion of the program has been viewed previously by one or more participants, control circuitry 304 may cause the warning indicator to be removed after the segments that have already been viewed during the synchronized viewing. In other embodiments, warning indicator 1304 includes an indication of which other viewers have watched the program and/or other pertinent information.

Figure 15:
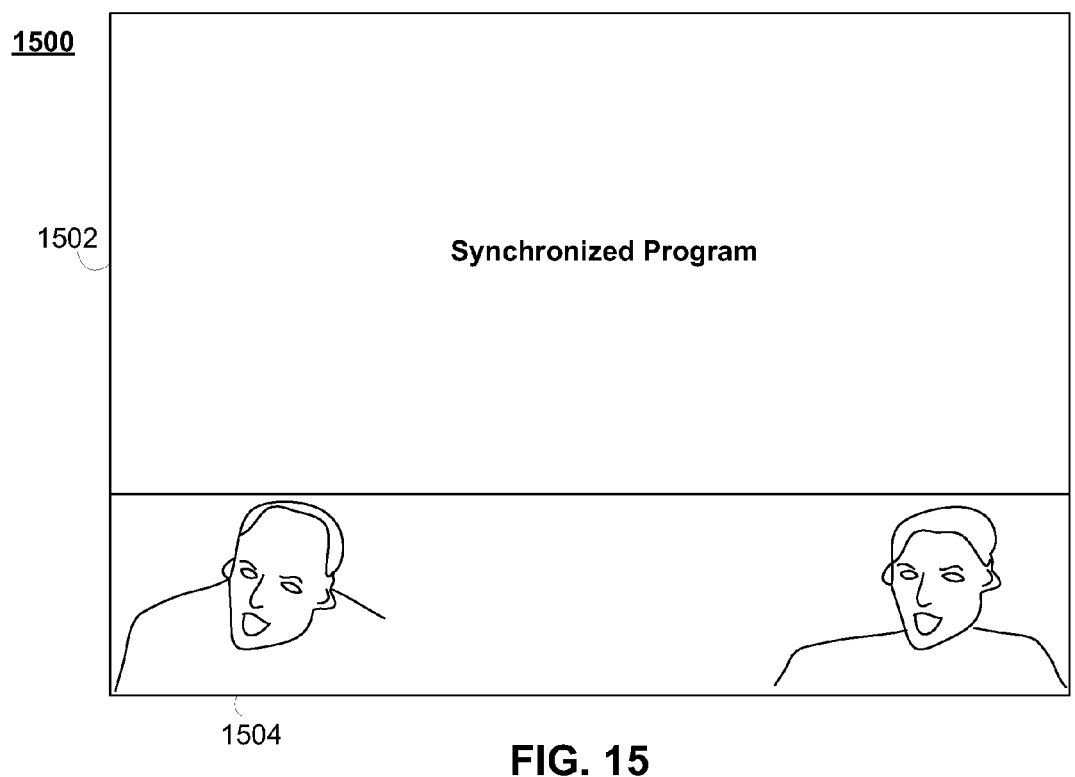
FIG. 15 is an illustrative display screen showing synchronized program display with a video chat feature in accordance with an embodiment of the invention.

Control circuitry 304 and communication paths may enable interactive communication between viewers participating in synchronized viewing. Two illustrative display screens 1400 and 1500 showing interactive synchronized viewing are shown in FIGS. 14 and 15. In each case, a portion of the screen is used for interacting with other users engaged in synchronized viewing. Control circuitry 304 may cause the display of the program to be resized, either to scale or not to scale, above the interaction portion of the screen. Alternatively, the interaction portion may be laid over top of the program, which is not resized, and the interaction portion may be partially transparent. The interaction portion need not be below the synchronized program, but may be above it, to the side, or on a different display entirely.

The display screen 1400 shown in FIG. 14 includes a text commentary portion 1404 where users can enter text comments using, for example, a keyboard, a touch pad, an on-screen keyboard, or telephone text entry. The display screen also shows the comments of other users engaged in the synchronized viewing. The display screen 1500 shown in FIG. 15 includes a video chatting portion 1504 where users may view and listen to other participants. The user equipment may include a camera and a microphone so that the user may participate in video chatting. Control circuitry 304 may allow a user to mute and/or remove the image of one or more of the other viewers participating in the synchronized viewing.

In a specific embodiment, the program is a video provided to a first user device and a second user device via a first and second video-on-demand (VOD) provider, respectively. A VOD provider may be, for example, a cable provider, a satellite provider, or an internet provider. In some embodiments, one or more of the VOD providers may be a streaming media service. For example, the first user device may access a subscription to a first VOD provider (e.g., HULU PLUS), and the second user device may access a subscription to a second VOD provider (e.g., TIME WARNER CABLE VOD). A synchronization application, described below, may run on the user devices to enable synchronization of a retrieved VOD. A particular program may be available from the first VOD provider before becoming available from the second VOD provider. In this embodiment, the availability may not be based on the location in which the user device is located. Neither user device records the program when it becomes available, since the user devices can access the stored video on command from their respective VOD providers.

A user may instruct control circuitry 304 of a particular scheduled time for synchronized viewing, wherein the scheduled time is after the time at which the program is expected to be available from both. VOD providers. In other embodiments, the scheduled time may be the time at which the video becomes available from by the second VOD provider. The time at which a program becomes available by one or both VOD providers may not be known. In such a case, control circuitry can be instructed to generate an alert for one or both of the users when the program becomes available. The users can then opt to either immediately view the program or schedule a later time for synchronized viewing of the program. When synchronized, each video accesses a streaming version of the program or video from their respective VOD provider.

As described above in relation to FIG. 12, if control circuitry 304 in the first user equipment receives a request to access the program ahead of the scheduled time for synchronized viewing or before it becomes available by the second user equipment, control circuitry 304 of the first user equipment may generate a warning and instruct that the warning be displayed. The user can then decide whether or not to view the program. If the user decides to view the program, control circuitry 304 at the second user device may receive an alert that the program has been viewed. Such an alert may take the form of a warning indicator as discussed in relation to FIG. 13.

A VOD application for accessing VODs supplied by a VOD provider may or may not enable cross-platform synchronization. In some cases, since the VOD application may not be configured for synchronizing a VOD with a video accessed by any other user device, let alone a video accessed by another user device from a different VOD provider, control circuitry 304 may access a synchronization application that enables the synchronization of a retrieved. VOD with a video accessed by another user device. The synchronization application provides instructions with which control circuitry 304 can access and, in some embodiments, display a video feed from a VOD application running on the same user device as the synchronization application. The synchronization application may also provide instructions with which control circuitry 304 can synchronize the program being displayed on the first user device with the program being displayed on the second user device using data retrieved from a second user device. Techniques for synchronizing the display of a program are discussed below in relation to steps 1618 and 1622 of FIG. 16.

Figure 16:
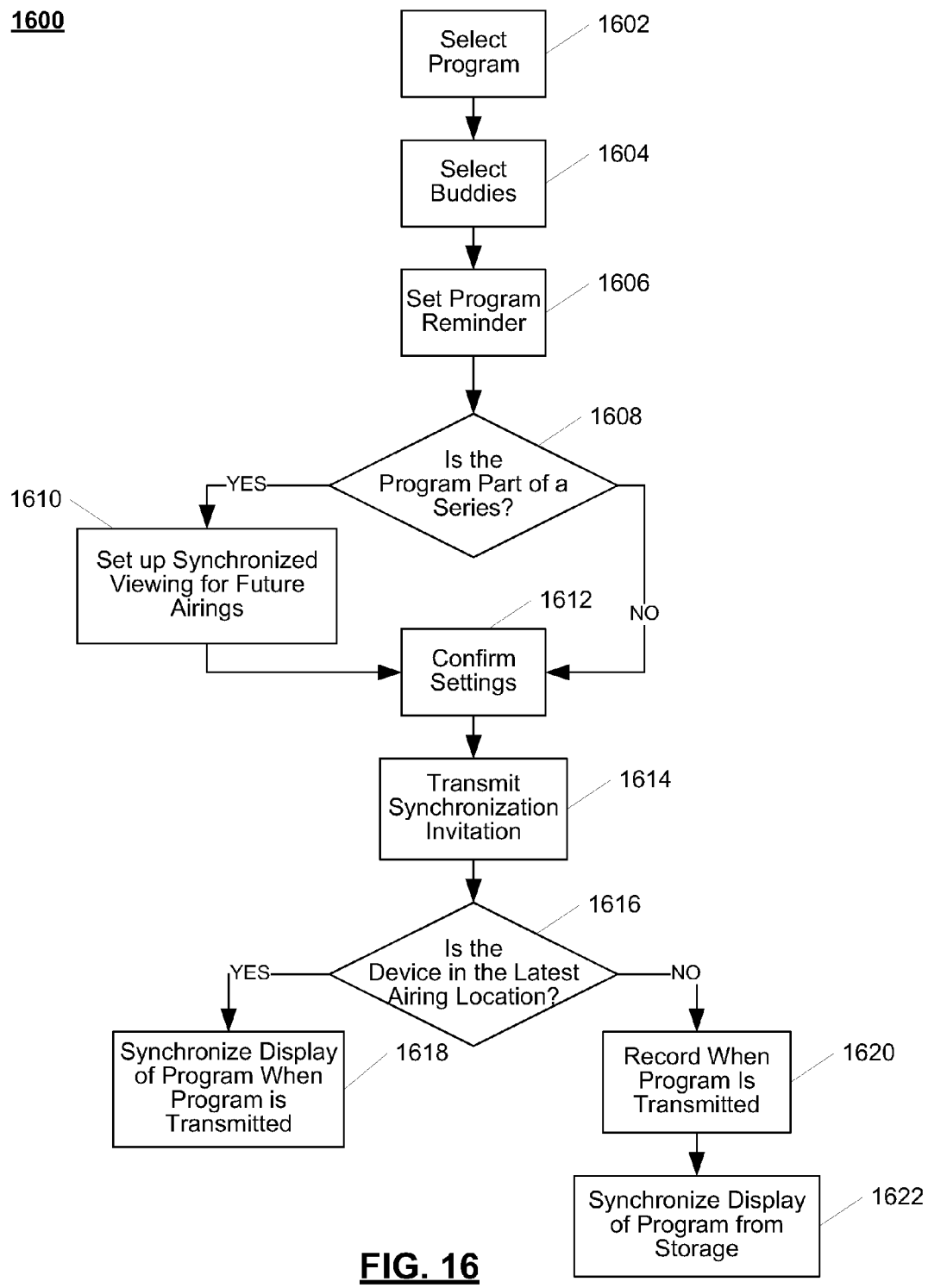
FIG. 16 shows an illustrative process for setting up and engaging in synchronized viewing in accordance with an embodiment of the invention.

FIG. 16 shows an illustrative process 1600 for setting up and engaging in synchronized viewing. The process includes receiving information related to the program for synchronized viewing, the other participants for synchronized viewing, a reminder request, and a synchronized viewing frequency of the program (steps 1602-1610). The process then involves sending a synchronization invitation and, in some cases, recording the program (steps 1614, 1616, and 1620). The process further involves synchronizing the program (steps 1618 and 1622).

Control circuitry 304 in a user device receives from user input interface 310 user input indicating a program to be scheduled for synchronized viewing (step 1602). For example, control circuitry 304 may instruct display 312 to present a user interface for receiving a user selection in a program in a program guide, as described in reference to FIG. 5. In some embodiments, control circuitry 304 may alternatively cause display 312 to present a list of all available programs, a list of recently released programs, a list of pay-per-view programs, a list of a user's favorite programs, or any other list or other representation of programs. Control circuitry 304 may provide an interface on display 312 that allows a user to search for programs using, for example, titles, actors, or keywords using user input interface 310.

Control circuitry 304 may also receive from user input interface 310 user input indicating one or more buddies or groups to be invited to participate in synchronized viewing (step 1604). For example, control circuitry 304 may provide a user interface via display 312 for receiving via user input interface 310 a user selection of buddies or groups, as described above in reference to FIG. 7. In some embodiments, control circuitry 304 may provide a list of favorite buddies and/or groups. Control circuitry 304 may determine and instruct display 312 to present a list of buddies and/or groups that it predicts a user will want to invite based on participants in the user's previous synchronized viewing. Furthermore, once control circuitry 304 receives one or more selections of buddies or groups from the user via user input interface 310, control circuitry 304 determines and causes the display of suggested additional buddies that the user is more likely to want to invite based on the buddy or buddies already selected.

Control circuitry 304 may also receive from a user via user input interface 310 a request to receive a reminder for the synchronized viewing (step 1606). For example, control circuitry 304 may provide a user interface on display 312 for receiving via user input interface 310 a request for a reminder as described in reference to FIG. 8. Control circuitry 304 may also provide a user interface on display 312 for receiving via user input interface 310 a reminder communication method preference from a user. For example, the user may be able to select to receive a reminder on user television equipment 402, user computer equipment 404, wireless user communications device 406, an alarm clock, or another device for transmitting a reminder. The user can select that a reminder be automatically created for invitees.

Control circuitry 304 may determine whether the selected program is part of an ongoing series (decision 1608). If the program is part of a series, control circuitry 304 may receive from a user via user input interface 310 an indication of a frequency with which the program should be scheduled for synchronized viewing (step 1610). For example, control circuitry 304 may provide a user interface on display 312 for receiving via user input interface 310 a request to schedule the program for synchronized viewing a single time, each time any episode in the series is aired, or each time a new episode of the series is aired, as described above in reference to FIG. 8. For example, the program may be part of a series, a miniseries, or a movie series (e.g., a trilogy). If the program is a sports event, control circuitry 304 may receive a request from the user that similar sports programs be scheduled for synchronized viewing. For example, if a user is scheduling synchronized viewing of the New York Jets vs. the New England Patriots, control circuitry 304 may allow the user to request via user input interface 310 that all New York Jets games be scheduled for synchronized viewing. Similarly, control circuitry 304 may allow other types of programs having a common theme or participants, such as award shows or stand-up comedy programming featuring a particular comedian, to be scheduled as a group for synchronized viewing even though they are not part of a series.

Steps 1602 through 1610 do not have to be performed in the order shown in FIG. 16, but can be performed in any order. Additionally, one or more of the steps 1602 through 1610 may be omitted. Once information related to some or all of the program, buddies and/or groups, reminder, and frequency of the program selected for synchronized viewing have been received, control circuitry 304 may seek a user confirmation of the synchronization selections (step 1612). For example, control circuitry 304 may instruct display 312 to present a Synchronization Summary screen 900 as described in relation no FIG. 9. When control circuitry 304 receives via user input interface 310 a selection of "Done", the synchronization is considered confirmed and synchronized viewing is scheduled.

Once control circuitry 304 receives confirmation, it transmits synchronization invitations to the selected buddy or buddies and/or group(s) via communications network 414 (step 1614). The user device may communicate directly with other users' user device(s) to transmit invitations, or the invitations may be transferred through a central server or other centralized system. The user device may receive responses from the invitees via the same communication pathway of communications network 414 through which the invitation was sent or via a different communication pathway.

Control circuitry 304 determines whether it is running on a user device on which the program becomes available the latest of the participating user devices by comparing the time at which the program becomes available at the user device to the time(s) at which the program becomes available at other participating user devices (decision 1616). For example, if a user device located in California invites a buddy in New York to simultaneously view a program, the program may become available (e.g., is broadcast) in California after it becomes available (e.g., is broadcast) in New York in this case, the California viewer is in the latest broadcasting location, and the user device in New York records the program when it is broadcast at an earlier time, e.g., three hours earlier. The program is then synchronized as the program is being transmitted to and received by the user device in California (step 1618). At the scheduled time for synchronized display of the program, the user devices may automatically begin displaying the synchronized program, or one or more of the participants may need to input a command to tune to the program or otherwise begin participating in synchronized viewing.

On the other hand, if the user device located in New York invites a buddy in California to view a program, the program may be broadcast in New York before it is broadcast in California. So, the user device in New York is not in the latest broadcast location. In this case, control circuitry 304 of the user device in New York send an instruction via communications network 414 to the user device in New York to record the program when it is transmitted (step 1620), and the stored program is synchronized with the program being broadcast in California as it is being broadcast (step 1622).

A program recorded, aired, or otherwise transmitted in one location may not line up precisely with a program recorded, aired, or otherwise transmitted in a second location, even if the first and second locations are in the same time zone. For example, the lengths of the advertisements of programs available to different users or in different locations may differ, or the speed at which the program is displayed may be slightly faster or slower at one location than another. If the connection over which a program is being transmitted has any instability, the instability may create an interruption or delay in the data stream. Therefore, the user devices may coordinate to ensure simultaneous display of the program. In some embodiments, user devices are configured to communicate directly with other user devices in one or more other locations via communications network 414. In such embodiments, control circuitry 304 on a first user device may be a "synchronization master" for coordinating the viewing. For a particular program scheduled for synchronized viewing, the synchronization master may be the user device that scheduled the synchronized viewing, the user device with the most advanced processor, the user device that is the most centrally located geographically, the user device with a particular software package for carrying out the functions of a synchronization master, or selected for some other reason. The synchronization master can be selected by the device that scheduled the synchronized viewing, self-appointed, selected by a central server, or selected by a user.

Figure 17:
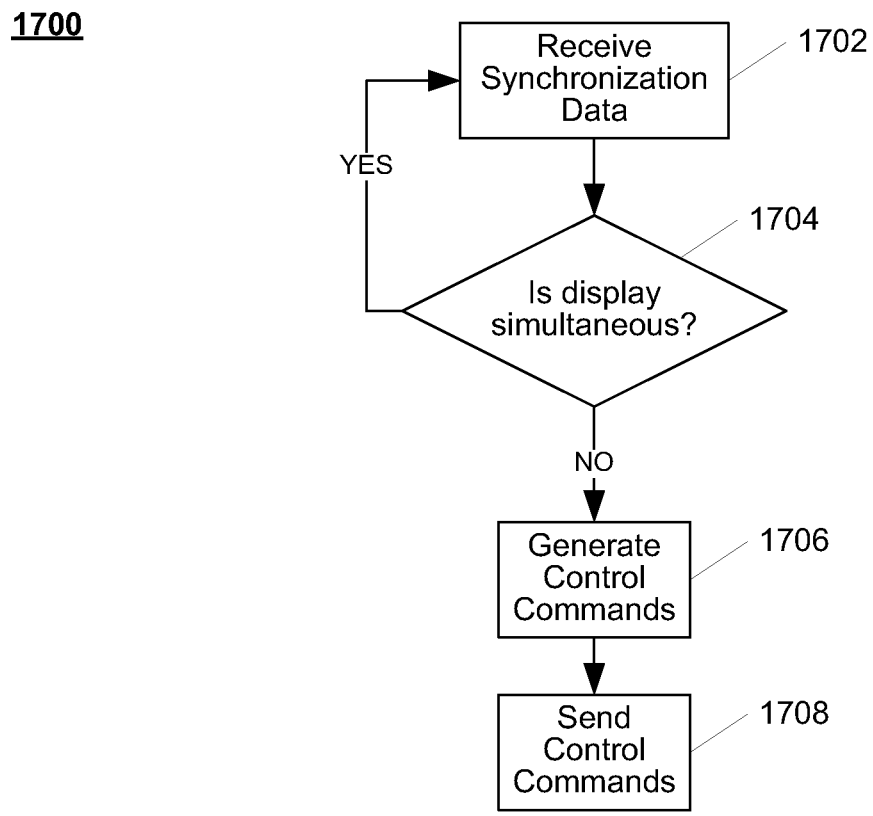
FIG. 17 shows an illustrative process 1700 for using a synchronization master to synchronize viewing on multiple devices in accordance with an embodiment of the invention.

FIG. 17 shows an illustrative process 1700 for using the synchronization master to synchronize viewing on multiple devices. The synchronization master may receive, from the other participating user devices via communications network 414, synchronization data that allows the synchronization master to automatically maintain the synchronized viewing for the participants (step 1702). For example, the synchronization data may include information indicating a particular screen or segment and the time at the screen or segment was or will be displayed so that the synchronization master can compare the screens or segments displayed by particular devices at a particular time. In other embodiments, the synchronization master determines or receives an indication of the amount of time it takes for data to be received from the other participating devices, i.e., the communication delays in communications network 414 between each participating device and the synchronization master. This way, the synchronization master can determine the time at which a screen or segment was displayed by subtracting the communication lag from the time that the information related to the screen or segment was received at the synchronization master. If participating user device is playing a recording rather than displaying a program as it is being transmitted, control circuitry 304 on the participating user device may automatically send synchronization data related to at least the display speed and advertisement timing of the recording to the synchronization master before the program and/or advertisements are displayed. This may improve the synchronization, and it may reduce the processing demand on the synchronization master.

Once the synchronization master has received synchronization data from the other participating user devices, the synchronization master uses the received synchronization to compare the currently display at the devices and determine whether or not the user devices are displaying the program simultaneously (decision 1704). As long as the display is simultaneous, the synchronization continues receiving and analyzing synchronization data (steps 1702 and 1704). If the display is determined to no longer be simultaneous, e.g., if an advertisement displayed by a first user device is longer than an advertisement displayed by a second user device, the synchronization master automatically generates control commands (step 1706) and sends the commands via communications network 414 to some or all of the user devices (step 1708) to cause the receiving user device(s) to adjust the display of the program. In the aforementioned example, the synchronization master may generate and send a command to the first user device to fast forward or skip through the advertisement or a command to the second user device to rewind and/or pause until the program displayed at the first user device catches up, or the synchronization master may generate and send both types of commands. The synchronization master also may generate commands for its own program display.

To accommodate the display of a program as it is being aired or otherwise transmitted in real-time, a user device may include a buffer that enables minor adjustments in the display of the program. In some embodiments, the control circuitry 304 instructs the user device to record the program as it is being aired and as it is being synchronized; in this case, the display of the stored program can be adjusted.

In some embodiments, a central server or a plurality of servers coordinates the synchronized viewing. In this case, the central server or servers may perform some or all of the functions described above in relation to the synchronization master.

Figure 18:
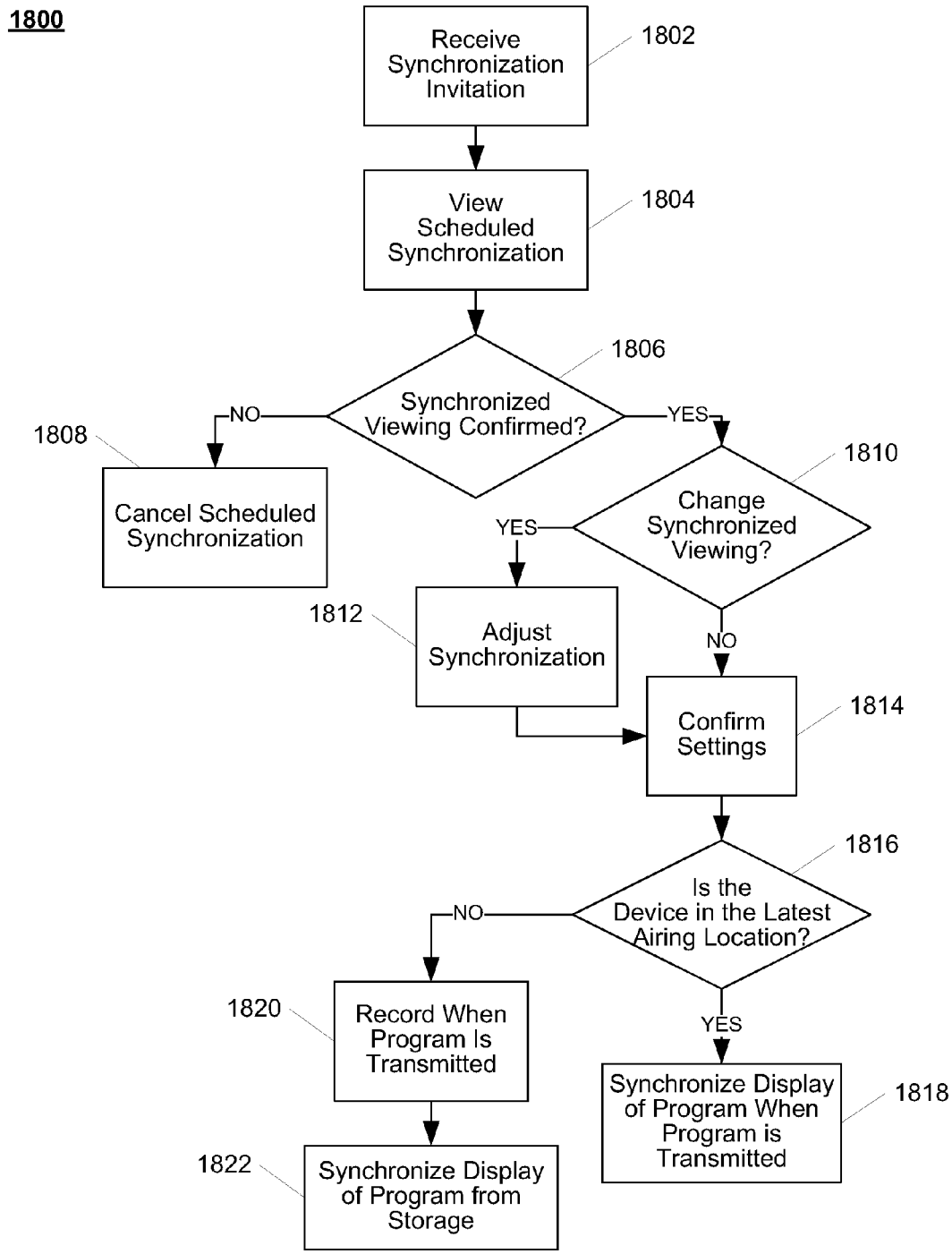
FIG. 18 shows an illustrative process for receiving and responding to a synchronization invitation in accordance with an embodiment of the invention.

FIG. 18 shows an illustrative process 1800 for receiving and responding to a synchronization invitation and engaging in synchronized viewing. The process includes receiving and displaying an invitation for synchronized viewing of a program (steps 1802 and 1804). The process then involves receiving a response to the synchronization invitation (steps 1806-1814). The process further involves recording and presenting the program (steps 1816-1822).

A user device receives via communication network 414 a synchronization invitation from another user device at another location (step 1802). The synchronization invitation includes information relating to a program scheduled for synchronized viewing. The synchronization invitation may be received directly from the other user device or may be delivered through a network or from a central server. Control circuitry 304 at the user device receiving the invitation then instructs display 312 to present the invitation to the user (step 1804). For example, control circuitry 304 may instruct display 312 to present a user interface for displaying a summary of the invitation including, e.g., the program title, the other participants, and the scheduled viewing time, as described in relation to FIG. 10.

Control circuitry 304 may also receive via user input interface 310 a user's response to the invitation as described in relation to FIG. 10. In this case, control circuitry 304 receives information indicating whether the user has confirmed participation in synchronized viewing (decision 1806). If control circuitry 304 receives an indication via user input interface 310 that the user has declined the invitation, control circuitry 304 cancels the scheduled synchronization (step 1808) and may send a notification via communications network 414 no the inviting user device and in some embodiments no the other invited user devices. In some embodiments, control circuitry 304 can allow the user to defer making a decision right away as to whether he will participate in the synchronized viewing. In such embodiments, control circuitry 304 may add the synchronized viewing to a schedule of synchronized viewing, although control circuitry 304 may denote that the response was deferred and that the user has not yet committed to the synchronized viewing.

If the user has accepted the invitation, control circuitry 304 determines whether the user wishes to change any features of the synchronized viewing, e.g., the program to be viewed, the other participants, whether a reminder will be given, or the scheduled frequency (step 1810). In the user interface shown in FIG. 10, control circuitry 304 and user input interface 310 allow a user to accept the invitation as received by selecting button 1006, accept the invitation as received and set a reminder by selecting button 1008, or accept the invitation upon adjusting the synchronization settings by selecting button 1012. In the case that control circuitry 304 receives via user input interface 310 user input indicating that the user wishes to adjust the settings, control circuitry 304 provides via display 312 a user interface similar to the interfaces shown in FIG. 9 or FIG. 6 from which the user can make the desired changes with user input interface 310 (step 1312). Once control circuitry 304 has received via user input interface 310 user adjustments so the synchronization or has received input that the user does not wish to adjust the synchronization settings, control circuitry 304 may request that the user confirm the settings (1814). If the user has adjusted the synchronization settings, control circuitry 304 causes she user device to send via communications network 414 the changes to the other participants, who may accept the revised synchronization settings, reject the revised synchronization settings, further adjust the synchronization settings, or decline to participate in the revised synchronization.

Once the settings have been confirmed, control circuitry 304 determines whether it is running on user equipment that is in the location in which the program becomes available the latest of all the participating locations (decision 1818). This step may be similar to decision 1618 described in relation to FIG. 16. Control circuitry 304 may record in storage 308 the program when it becomes available (step 1820) and participates in synchronized viewing when all of the participating user devices can access the program (steps 1822 and 1818). The methods for program synchronization may be similar to the methods for program synchronization described above in relation to FIG. 16.

Figure 19:
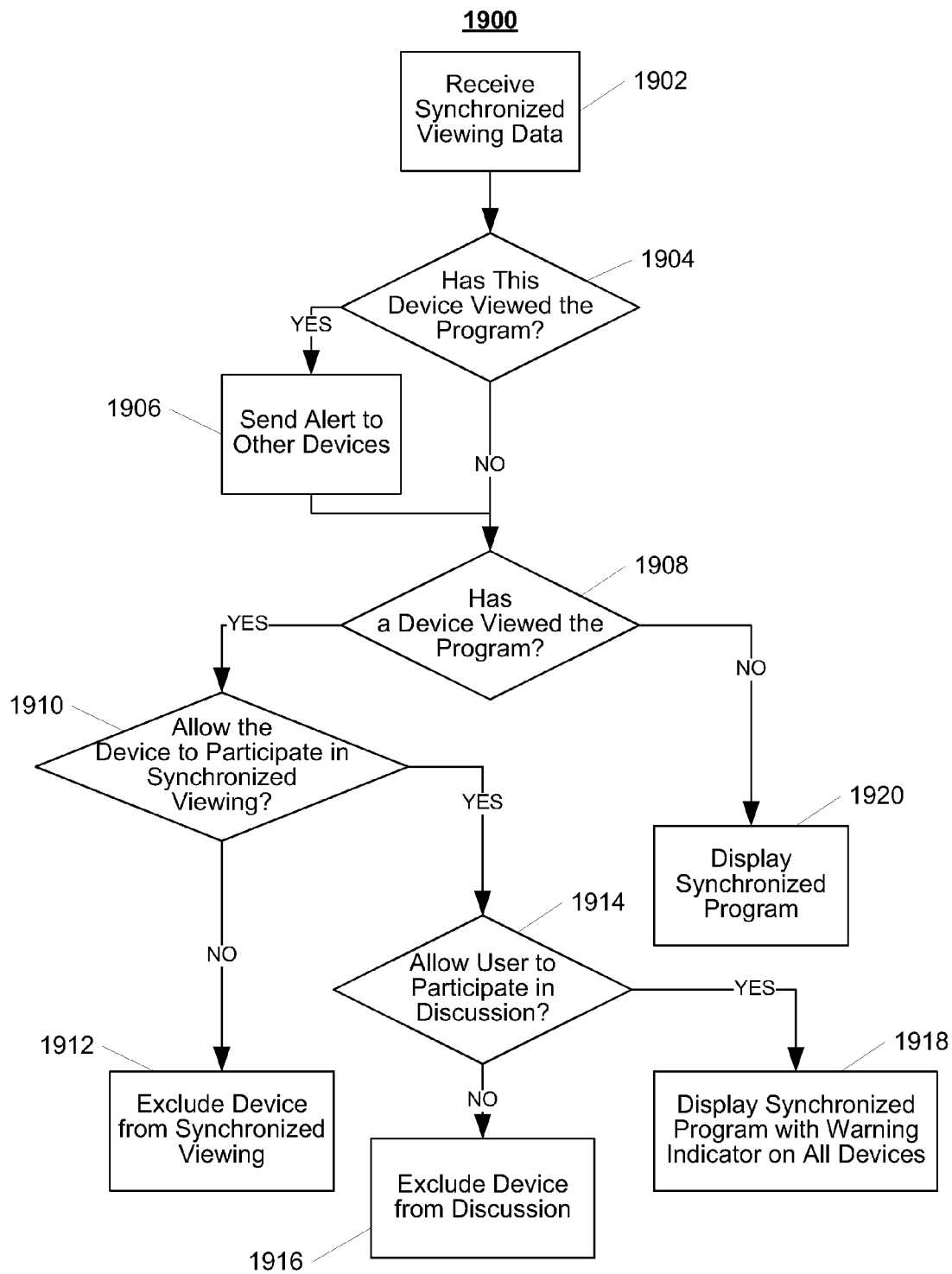
FIG. 19 shows an illustrative process for addressing a situation in which a device scheduled for synchronized viewing of a program has viewed the program ahead of schedule in accordance with an embodiment of the invention.

FIG. 19 shows an illustrative process 1900 for addressing a situation in which a user device scheduled for synchronized viewing of a program has viewed the program ahead of schedule. The process includes receiving via communication network 414 data related to a scheduled synchronized viewing of a program (step 1902). The process then involves determining whether the device has displayed the program and, if so, sending an alert to other devices (steps 1904 and 1906). The process may further include addressing a situation in which one of the devices scheduled to participate in synchronized viewing has viewed the program (steps 1908-1916).

Control circuitry 304 in a user device receives via communications network 414 data related to a scheduled synchronized viewing of a program (step 1902). The data may be received either from a user interacting with the user device, as described in relation to steps 1602-1612 of FIG. 16, or through an invitation from another user device in another location, as described in relation to step 1902 of FIG. 19. Control circuitry 304 monitors the programs being viewed on the device to determine whether the device is displaying or has already displayed the program scheduled for synchronized viewing before the scheduled time for synchronized viewing (step 1904). As described above in relation to FIG. 12, it is undesirable for a participant in synchronized viewing to have viewed the program before the other participants, as this may, for example, allow the viewer to cheat on a game show or spoil the plot of a drama or the result of a sports event. Thus, if control circuitry 304 determines that the viewer has viewed the program ahead of the scheduled time, control circuitry 304 automatically sends an alert via communications network 414 to the other devices scheduled to participate in synchronized viewing (step 1906). In some embodiments, this information is registered or stored at a central database for retrieval by the other user device. A user device may able to determine whether another user device has viewed a program without the other user device transmitting an alert, e.g., by querying the other user device or querying media content source 416.

If control circuitry 304 determines that no participants have viewed the program ahead of schedule, the program is simultaneously presented (step 1920), as described above in relation to FIGS. 16 and 17. If control circuitry 304 determines that a participant has viewed the program ahead of schedule, a variety of actions could be taken, and the particular action may be dictated by guidelines. The guidelines for what action to take if the program was viewed may be established by toe user who created the invitation, established by the synchronization master, determined based on a vote, or determined based on other means. Exemplary guidelines are described below in relation to steps 1910-1918.

First, control circuitry 304 on the user device that has displayed the program before the scheduled time determines if the guidelines in place for the scheduled program still permit the user to participate in the synchronized viewing (decision 1910). If the established guidelines dictate that the user may not participate, control circuitry 304 prevents the user device from participating so that the user is excluded (step 1912).

Next, if the guidelines dictate that the user is still permitted to participate in the synchronized viewing, control circuitry 304 on the user device chat has displayed the program ahead of schedule determines whether it should allow the user to participate in a discussion, such as the text or video chatting described above in relation to FIGS. 14 and 15 (decision 1914). If the user is allowed to participate in the discussion, control circuitry 304 on other participating user devices may display a warning on display 312, such as the warning shown in and described in relation to FIG. 13 (step 1918). If the user is not permitted to participate in the discussion, control circuitry 304 on the user device that has displayed the program ahead of schedule may cause display 312 to present the program and the discussion of the other participants, but exclude the user from participating in the discussion (step 1916).

In some embodiments, these actions are carried out not by control circuitry 304 on the user device that presented the program ahead of schedule, but rather, is carried out by a central server, a synchronization master, or another device inaccessible to the user. This would prevent the user from tampering with control circuitry 304 or the software running on control circuitry 304 such that it the user is still able to participate in the synchronized viewing and/or the discussion.

In some embodiments, the actions to take if the program was already viewed may be based on which participant has viewed the program. For example, if one participant is known to be a cheater or a blabbermouth, the participant may be excluded from synchronized viewing. On the other hand, if another participant has a poor memory or can be trusted not to spoil the program, that participant may be allowed to engage in synchronized viewing. In some embodiments, a predetermined course of may be overridden if the other participants believe that a viewer has in fact not viewed the program but was, for example, viewed by another member of the participant's household.

Figure 20:
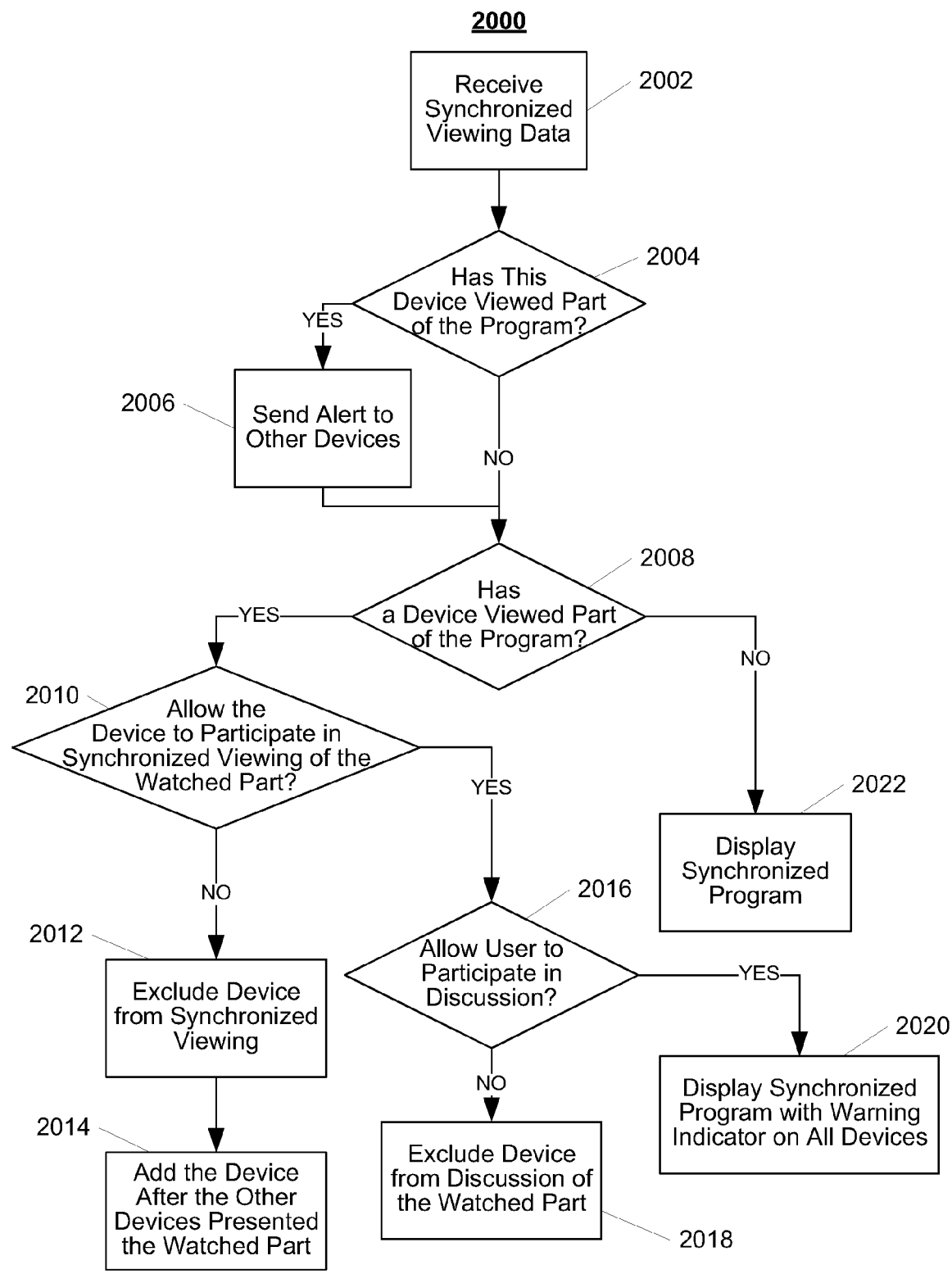
FIG. 20 shows an illustrative process for addressing a situation in which a device scheduled for synchronized viewing of a program has viewed a part of the program ahead of schedule in accordance with an embodiment, of the invention.

FIG. 20 shows an illustrative process 2000 for addressing a situation in which a device scheduled for synchronized viewing of a program has viewed a part the program ahead of schedule. The process includes receiving data related to a scheduled synchronized viewing of a program (step 2002). The process then involves determining whether the device has displayed a part of the program and, if so, sending an alert to other devices (steps 2004 and 2006). The process may further include addressing a situation in which one of the devices scheduled to participate in synchronized viewing has viewed a part the program (steps 2008-2020).

The steps of process 2000 are similar to the steps of process 1900 and may be carried out in a similar manner. However, in process 2000, it is determined whether a user device has displayed only a part or segment of the program, rather than the entire program (decision 2004). In this case, control circuitry 304 and/or the central server may take any of the actions described above with respect to process 1900. However, once the other participants have viewed the part that was presented ahead of schedule, the user device that had presented the program ahead of schedule may be permitted to participate in synchronized viewing. In this case, control circuitry 304 may automatically begin synchronized viewing once the user is permitted to participate, or the user may request to be added to the synchronized viewing.

If user device has displayed a middle segment or an end segment of a program rather than a beginning segment, control circuitry 304 may or may not allow the user to participate in synchronized viewing of the part of the program up to the segment that the user device has already been presented.

It should be understood that the above steps of the flow diagrams of FIGS. 16-20 may be executed or performed in any order or sequence not limited to the order and sequence shown and described in the figures. Also, some of the above steps of the flow diagrams of FIGS. 16-20 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for synchronizing simultaneous media asset viewing for users at different geographical viewing locations, the method comprising:
   receiving, with communications circuitry at a first location, a request to synchronize viewing of a media asset on a first user device at the first location and a second user device at a second location;
   determining, by control circuitry on the first user device, that the media asset is available for access by the second user device after becoming available for access by the first user device;
   scheduling, by the control circuitry, the media asset for recording on the first user device based on the determining; and
   synchronizing, by the control circuitry, viewing of the media asset using the recorded media asset.

2. The method of claim 1, further comprising causing the first user device to access a first video feed and the second user device to access a second video feed, wherein:
   the first video feed is a video feed of the recorded media asset; and
   the second video feed is a video feed of the media asset transmitted by a media source to the second user device.

3. The method of claim 1, further comprising:
   buffering, at the second user device, the media asset as it is being transmitted; and
   adjusting, at the second user device, the viewing of the media asset using the buffered media asset during the transmission of the media asset to maintain synchronization with the media asset being played back from storage at the second user device.

4. The method of claim 1, wherein the first location is in a different geographical time zone from the second location.

5. The method of claim 1, wherein synchronizing viewing further comprises at least one of pausing, speeding up, or slowing down the media asset at the first user device or the second user device.

6. The method of claim 1, further comprising:
   receiving a request to access the media asset at the first user device before the media asset becomes available for access by the second user device; and
   in response to the request to access the media asset, displaying an alert indicating existence of the request to synchronize the media asset and that the media asset is not yet available for access by the second device.

7. The method of claim 1, further comprising recording the media asset by the first user device when the media asset becomes available for access by the first device.

8. The method of claim 1, further comprising determining whether or not the media asset has been viewed by the first user device before becoming available for access by the second user device.

9. The method of claim 8, wherein, in response to determining that the media asset has been viewed by the first user device, preventing synchronized viewing of the media asset at the first user device with the media asset at the second user device.

10. The method of claim 8, wherein, in response to determining that the media asset has been viewed by the first user device, displaying an alert indicating that the media asset has been viewed at the first user device before becoming available for access by the second user device.

11. The method of claim 8, further comprising determining that the first user device has viewed a first part of the media asset and the first user device has not viewed a second part of the media asset;
   wherein synchronizing comprises synchronizing viewing of only the second part of the media asset at the first user device and the second user device.

12. A system for synchronizing simultaneous media asset viewing for users at different geographical viewing locations, the system comprising:
   communications circuitry at a first user location configured to receive a request to synchronize viewing of a media asset on a first user device at the first location and a second user device at a second location; and
   control circuitry on the first user device configured to:
   determine that the media asset is available for access by the second user device after becoming available for access by the first user device;
   schedule the media asset for recording on the first user device based on the determining; and
   synchronize viewing of the media asset using the recorded media asset.

13. The system of claim 12, wherein the first user device to access a first video feed and the second user device to access a second video feed, wherein:
   the first video feed is a video feed of the recorded media asset; and
   the second video feed is a video feed of the media asset transmitted by a media source to the second user device.

14. The system of claim 12, wherein control circuitry at the second user device is configured to:
   buffer the media asset as it is being transmitted; and
   adjust the viewing of the media asset using the buffered media asset during the transmission of the media asset to maintain synchronization with the media asset being played back from storage at the second user device.

15. The system of claim 12, wherein the first location is in a different geographical time zone from the second location.

16. The system of claim 12, wherein synchronizing viewing further comprises at least one of pausing, speeding up, or slowing down the media asset at the first user device or the second user device.

17. The system of claim 12, wherein the control circuitry is further configured to:
   receive a request to access the media asset before the media asset becomes available for access by the second user device; and
   in response to the request to access the media asset, display an alert indicating existence of the request to synchronize the media asset and that the media asset is not yet available for access by the second device.

18. The system of claim 12, wherein the control circuitry is further configured to cause the first user device to record the media asset when the media asset becomes available for access by the first device.

19. The system of claim 12, wherein the control circuitry is configured to determine whether or not the media asset has been viewed by the first user device before becoming available for access by the second user device.

20. The system of claim 19, wherein, in response to determining that the media asset has been viewed by the first user device, the control circuitry is further configured to prevent synchronized viewing of the media asset at the first user device with the media asset at the second user device.

21. The system of claim 19, wherein, in response to determining that the media asset has been viewed by the first user device, control circuitry at the second user device is further configured to display an alert indicating that the media asset has been viewed at the first user device before becoming available for access by the second user device.

22. The system of claim 19, wherein the control circuitry is configured to determine that the first user device has viewed a first part of the media asset and the first user device has not viewed a second part of the media asset;
    wherein synchronizing comprises synchronizing viewing of only the second part of the media asset at the first user device and the second user device.

\* \* \* \* \*